United States Patent
Chiu et al.

(10) Patent No.: US 7,234,855 B2
(45) Date of Patent: Jun. 26, 2007

(54) LAMP HAVING A PLANAR LIGHT-EMITTING SOURCE

(75) Inventors: Shao Chen Chiu, Taichung (TW); Chi Feng Cheng, Taichung (TW); Ray Long Tsai, Taichung (TW); Hui Hua Hu, Taichung (TW); Ming Yuan Lai, Taichung (TW)

(73) Assignee: Taiwan Green Point Enterprises Co., Ltd., Taichung (TW)

( * ) Notice: Subject to any disclaimer, the term of this patent is extended or adjusted under 35 U.S.C. 154(b) by 72 days.

(21) Appl. No.: 11/144,835

(22) Filed: Jun. 6, 2005

(65) Prior Publication Data

US 2006/0274553 A1 Dec. 7, 2006

(51) Int. Cl.
*F21V 7/04* (2006.01)

(52) U.S. Cl. .............. 362/615; 362/177; 362/199; 362/333; 362/281

(58) Field of Classification Search .......... 362/615, 362/177, 199, 333, 281
See application file for complete search history.

(56) References Cited

U.S. PATENT DOCUMENTS 6,530,670 B2 * 3/2003 Hirayama .................. 362/628
6,700,716 B2 * 3/2004 Sejkora ..................... 359/834
6,776,494 B2 * 8/2004 Fujino et al. ............... 362/600
7,083,317 B2 * 8/2006 Higashiyama ............. 362/612
2004/0114373 A1 * 6/2004 Lin ............................. 362/352
2005/0185422 A1 * 8/2005 Henriet et al. ............. 362/615

\* cited by examiner

*Primary Examiner*—Renee Luebke
*Assistant Examiner*—Jessica L. McMillan
(74) *Attorney, Agent, or Firm*—Troxell Law Office, PLLC

(57) ABSTRACT

A lamp having a planar light-emitting source includes a light-guiding structure, a light-emitting portion, and a shading supporting seat. The point-shaped lighting units of the light-emitting portion emit the point-shaped light beams toward the side plane of the light-guiding structure. Then, these beams enter the light-guiding structure. After turning approximately 90 degrees, a uniformly distributed planar light generated from the light-emitting plane of the light-guiding structure. So, a planar light source is obtained. In this invention, it has a planar light-emitting function with better lighting efficiency. The planar lighting is evenly distributed without shadow. Its energy consumption and heat generation are low. The product's life is prolonged. Its volume is small and it is portable.

3 Claims, 4 Drawing Sheets

LAMP HAVING A PLANAR LIGHT-EMITTING SOURCE

BACKGROUND OF INVENTION

1. Field of the Invention

The present invention relates to a lamp. Particularly, it relates to a lamp having a planar light-emitting source. This invention has a planar light-emitting function with better lighting efficiency. The planar lighting is evenly distributed without shadow. Its energy consumption and heat generation is low. The product's life is prolonged. Its volume is small and it is portable.

2. Description of the Prior Art

There are many kinds of traditional desk lamp. But, most of them use the electric bulb as the main lighting source.

One of them directly utilizes the light emitting diodes (or briefly called LED) as its lighting source 12. For example, as shown in FIGS. 11 and 12, it is a traffic light 92 having LED array. In this LED array, there is a plurality of point-shaped light source 921.

However, the traditional device has the following disadvantages.

[1] The lighting efficiency for point-shaped lighting source is poor. If one person just directly utilizes the LED as the light source, it can reduce the cost, but such point-shaped lighting source cannot provide enough brightness. So, the lighting efficiency is poor.

[2] There is a serious shadow problem. If someone uses the LED array as the light source, even though its brightness can be raised, the light still is not uniformly distributed. Also, the shadow problem among any adjacent LEDs is unavoidable.

[3] The energy consumption is high, its life is shorter, and it has heating problem. The traditional electric bulb's energy consumption is high. It also generates heat. After the long term of use, it is easy to be burned out. Thus, the product's life is relative short. In addition, the heating problem is another disadvantage.

[4] The cost is high and it causes the environmental problem. Because the traditional electric bulb's life is shorter, its overall lighting cost is higher. Besides, a traditional fluorescent tube contains mercury (Hg). Mercury is harmful for our environment.

[5] The volume is large and it is not easy to carry. The traditional lamp has larger volume so it will occupy more space. It is not easy to put into a pocket of clothes or into a bag. Thus, it is not easy to carry.

SUMMARY OF THE INVENTION

The primary object of the present invention is to provide a lamp having a planar light-emitting source. In which, it has a planar light-emitting function with better lighting efficiency.

The second object of the present invention is to provide a lamp having a planar light-emitting source. The planar lighting is evenly distributed without shadow.

The next object of the present invention is to provide a lamp having a planar light-emitting source. Its energy consumption and heat generation is low.

The other object of the present invention is to provide a lamp having a planar light-emitting source. The product's life is prolonged.

Another object of the present invention is to provide a lamp having a planar light-emitting source. Its volume is small and it is portable.

DETAILED DESCRIPTION OF THE PREFERRED EMBODIMENT

Figure 1:
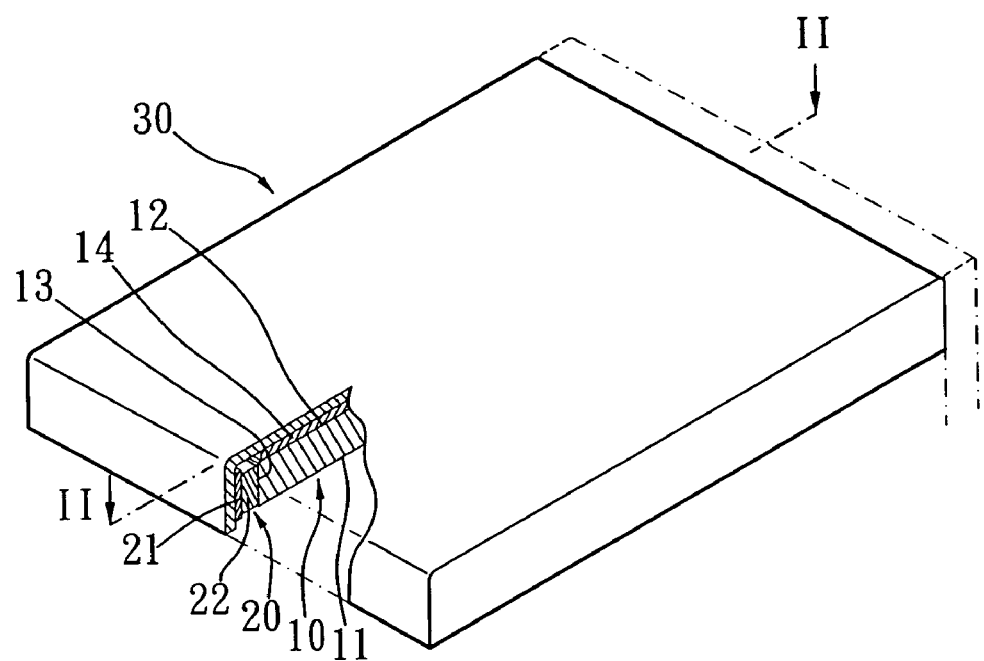
FIG. 1 is a perspective view of the present invention.
Figure 2:
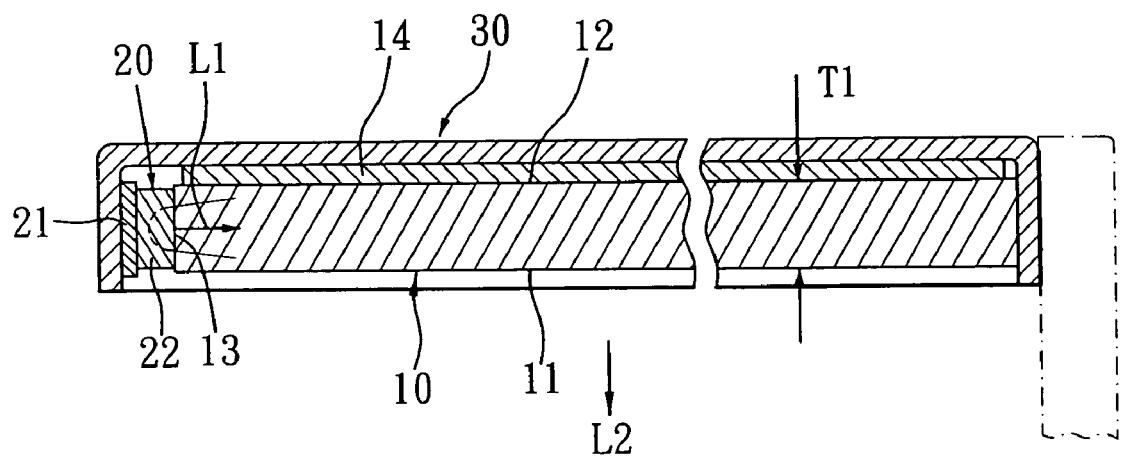
FIG. 2 is a cross-sectional view of the present invention.

The present invention relates to a lamp having a planar light-emitting source. As shown in FIG. 1 and FIG. 2, it mainly comprises a light-guiding structure 10, a light-emitting portion 20, and a shading supporting seat 30.

With regard to the light-guiding structure 10, its shape is similar to a plate structure. It has at least one light-emitting plane 11, a rear plane 12, and several side planes 13. Each side plane 13 is substantially perpendicular to the light-emitting plane 11. The rear plane 12 is disposed with a reflecting portion 14. A thickness T1 of 1 mm to 10 mm is between the light-emitting plane 11 and the rear plate 12.

Figure 3:
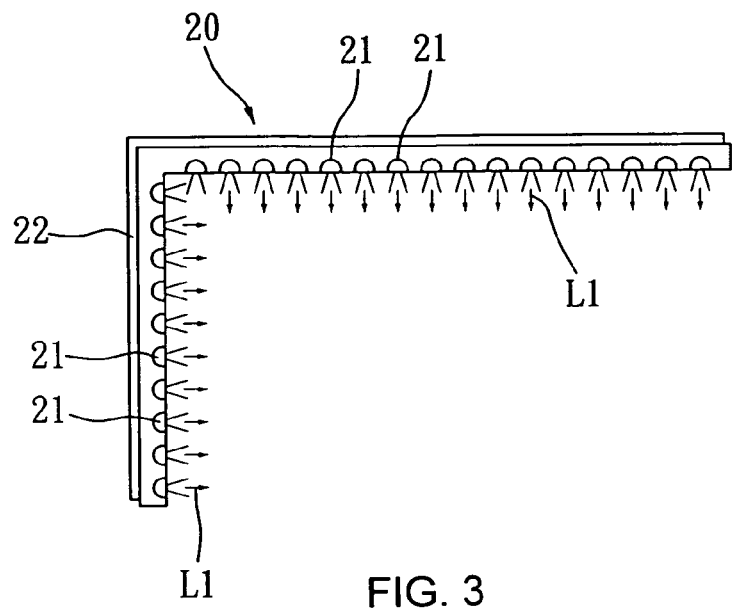
FIG. 3 shows the light-emitting portion of the present invention.
Figure 4:
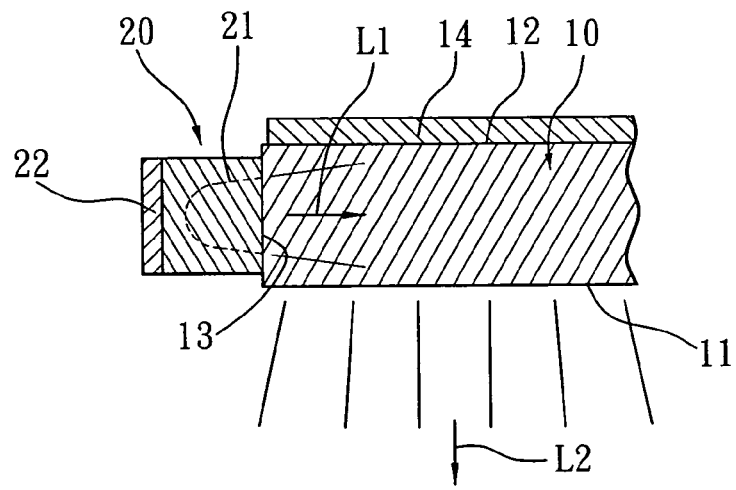
FIG. 4 is a cross-sectional view of a selected portion in FIG. 4.

For the light-emitting portion 20, as shown in FIG. 3, it has an electric circuit portion 21 and a plurality of point-shaped lighting units 22. This light-emitting portion 20 emits a plurality of point-shaped light beams L1 toward at least one predetermined side plane 13, as illustrated in FIG. 4. Concerning the point-shaped lighting unit 22, it could be a light emitting diode (or briefly called LED), a laser diode (briefly called LD) or other similar low energy-consumption element. Besides, this point-shaped lighting unit 22 can be selected from one of the following light emitting elements: the side emitting type or the upward emitting type.

About the shading supporting seat 30, it is used to secure the light-guiding structure 10 and to receive the light-emitting portion 20.

So, the point-shaped lighting unit 21 emits a plurality of point-shaped light beams L1 through the corresponding side plane 13. Next, these point-shaped light beams L1 go into the light-guiding structure 10 and then turn substantially 90 degrees to emit a uniform planar light L2 from the light-emitting plane 11 (as shown in FIGS. 2 and 4).

Of course, the reflecting portion 14 can be a reflecting optical film or a reflecting structure. Also, the plurality of point-shaped lighting units 21 can be L-shaped aligned arrangement to obtain a better effect. Of course, they can be arranged as a straight-line distribution. In this condition, it also emits light, but the result is not that good.

Figure 5:
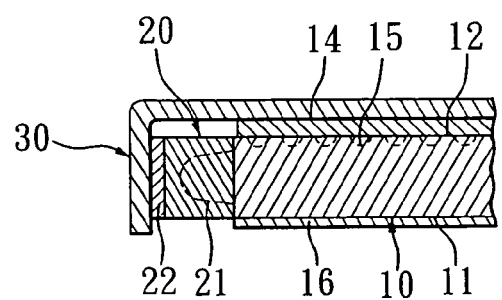
FIG. 5 is a cross-sectional view of a selected portion of another preferred embodiment of the present invention.

In addition, referring to FIG. 5, the light-guiding structure 10 is further disposed with a plurality of optical microstructures 15 (such as micro protrusions array or micro recesses array).

Figure 6:
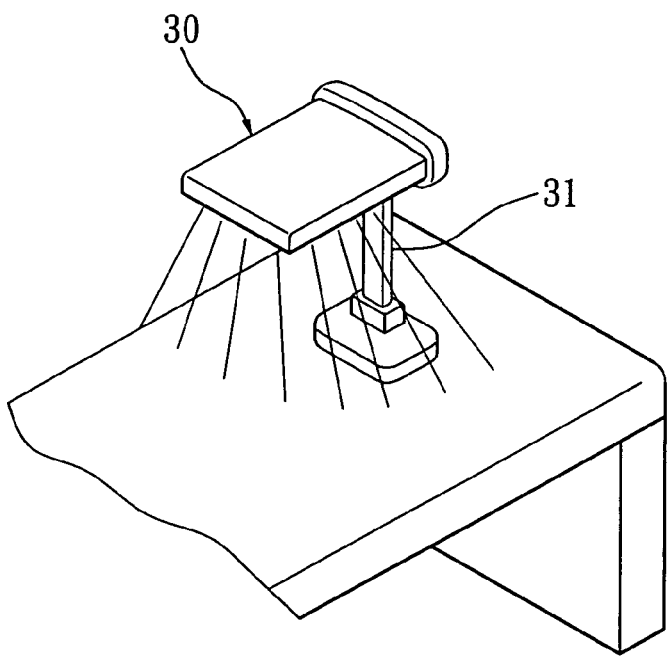
FIG. 6 is the first application mode of the present invention.

Also referring to FIG. 6, this invention can further comprise:

at least one optical film 16, the optical film 16 is selected from one of the following items: a brightness enforcement film (BEF), a prism film, a diffusion film, and a combined prism-and-diffusion film.

Regarding the actual application of this invention, it at least includes the following three modes:

The first mode is "Desk Lamp" as shown in FIG. 6. In which, the shading supporting seat 30 is connected to a desk lamp 31.

Figure 7:
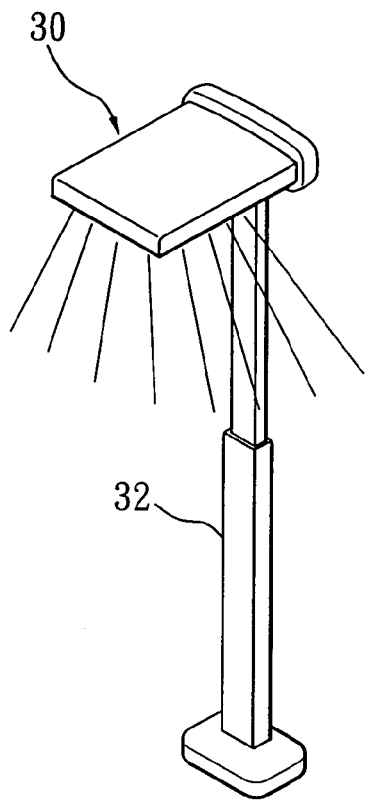
FIG. 7 is the second application mode of the present invention.

The second mode is "Floor Lamp" as shown in FIG. 7. In which, the shading supporting seat 30 is connected to a floor lamp 32.

Figure 8:
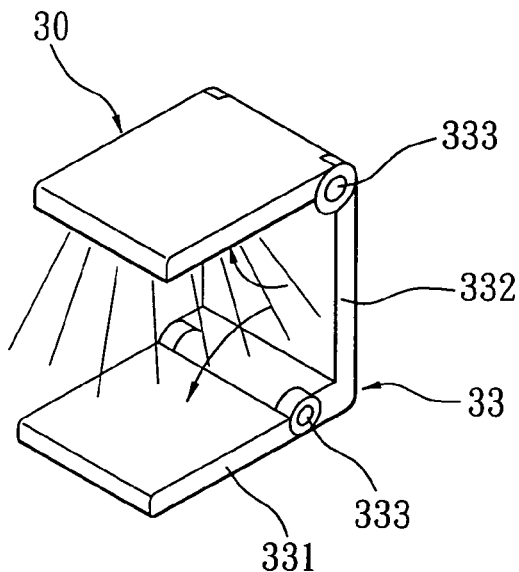
FIG. 8 is the third application mode of the present invention.
Figure 9:
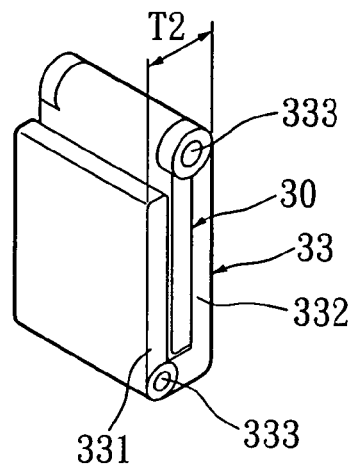
FIG. 9 is the fourth application mode of the present invention.
Figure 10:
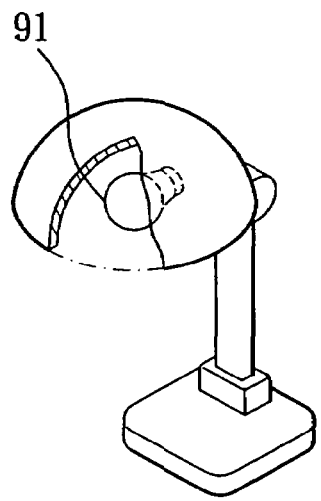
FIG. 10 illustrates the traditional desk lamp having an electric bulb.
Figure 11:
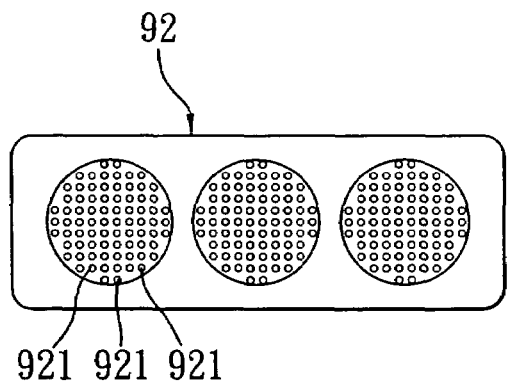
FIG. 11 shows a traditional traffic light having Leeds.
Figure 12:
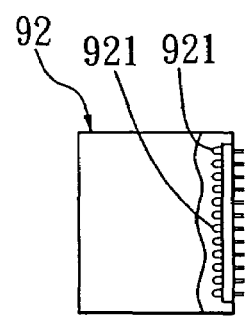
FIG. 12 is a cross-sectional view of the traditional traffic light.

The third mode is "Portable Folding Lamp" as shown in FIGS. 8 and 9. In which, the shading supporting seat 30 includes:

a horizontal plate 331 having a thickness between 1 mm to 20 mm;

a vertical plate 332 having a thickness between 1 mm to 20 mm, two opposite ends of the vertical plate 332 being pivoted with two pivoting portions 333 for connected with the shading supporting seat 30 and the horizontal plate 331;

so that the portable folding lamp 33 having a folding condition that having a total thickness T2 smaller than 50 mm, as shown in FIG. 9.

In addition, because the light-emitting plane 11 emits light by a "planar" type. So, the generated light is quite uniformly distributed. Also, there is no shadow problem. Plus, its lighting area is larger.

About the reflecting portion 14, it can be formed by directly sputtering method. In this embodiment, it can be selected from aluminum, aluminum alloy, silver, silver alloy, etc.

For the electric circuit portion 21, it is a traditional printed circuit board (briefly called PCB). In addition, in order to enhance the brightness, at least one reflecting portion 14 can be disposed on. The shading supporting seat 30 can be selected from Polycarbonate (briefly called PC), metal frame, etc.

The advantages and functions of this invention can be summarized as follows:

[1] This invention has a planar light-emitting function with better lighting efficiency. In this invention, the light-emitting portion is disposed with a plurality of point-shaped lighting units for emitting light beams toward the side plane of the light-guiding structure. The light beams will transmit inside the light-guiding structure and then reflect out from the light-emitting plane of the light-guiding structure. Therefore, the multiple point-shaped light sources are converted into a single uniformly distributed planar light source. Thus, it has better lighting efficiency. The lighting area is larger. Its color rendering index and directivity are both enhanced.

[2] The planar lighting is evenly distributed without shadow. The light generated from this invention is from the light-emitting plane of the light-guiding structure. There is no shadow at all. Thus, it solves the traditional shadow problem.

[3] Its energy consumption and heat generation is low. In this invention, all the point-shaped lighting units are LED or similar low energy consumption element. Its energy consumption is low. Accordingly, the heat generated is less. The product's life is prolonged.

[4] It has lower cost and less environmental pollution. This invention utilizes the LED or similar low energy consumption element. So, the required electric current is lower and the cost is less. By the light-guiding structure, its brightness can be enhanced. Thus, it is more competitive in the market. It has less environmental problem.

[5] Its volume is small and it is portable. If this invention is completely folded, its total volume will be minimized. Even it can be placed inside the pocket of clothes, a business suitcase, a book bag or the like. It is very small and easy to be carried.

The above embodiments are only used to illustrate the present invention, not intended to limit the scope thereof. Many modifications of the above embodiments can be made without departing from the claim(s) of the present invention.

What is claimed is:

1. A lamp having a planar light-emitting source comprising:

a plate-shaped light-guiding structure having at least one light-emitting plane, a rear plane and a plurality of side planes, each side plane being substantially perpendicular to said light-emitting plane, said rear plane is disposed with a reflecting portion, a thickness of 1 mm to 10 mm being between said light-emitting plane and said rear plate;

a light-emitting portion having an electric circuit portion and a plurality of point-shaped lighting units;

said light-emitting portion emitting a plurality of point-shaped light beams toward at least one predetermined side plane;

a shading supporting seat for securing said light-guiding structure and receiving said light-emitting portion;

so that said point-shaped lighting units emitting a plurality of point-shaped light beams, through said corresponding side plane and then entering said light-guiding structure, turning substantially 90 degrees to emit a uniform planar light from said planar light-emitting source, wherein said light-guiding structure is disposed with a plurality of optical micro-structures, and wherein said shading supporting seat is connected to a portable folding lamp, said portable folding lamp including:

a horizontal plate having a thickness between 1 mm to 20 mm;

a vertical plate having a thickness between 1 mm to 20 mm. two opposite ends of said vertical plate being pivoted with two pivoting portions for connecting with said shading supporting seat and said horizontal plate;

so that said carrying lamp seat has a folding condition with a total thickness smaller than 50 mm.

2. The lamp having a planar light-emitting source as claimed in claim 1, wherein said reflecting portion is a reflecting optical film and said plurality of point-shaped lighting units being L-shape aligned arrangement.

3. The lamp having a planar light-emitting source as claimed in claim 1, further comprising:

at least one optical film, said optical film being selected from a brightness enforcement film (BEF), a prism film, a diffusion film, and a combined prism-and-diffusion film.

* * * * *